United States Patent
Claussen et al.

(10) Patent No.: US 11,390,295 B2
(45) Date of Patent: Jul. 19, 2022

(54) VEHICLE CONTROL SYSTEM

(71) Applicant: Westinghouse Air Brake Technologies Corporation, Wilmerding, PA (US)

(72) Inventors: Christopher Claussen, Cedar Rapids, IA (US); Joseph Gorman, Cedar Rapids, IA (US)

(73) Assignee: WESTINGHOUSE AIR BRAKE TECHNOLOGIES CORPORATION, Wilmerding, PA (US)

(*) Notice: Subject to any disclaimer, the term of this patent is extended or adjusted under 35 U.S.C. 154(b) by 24 days.

(21) Appl. No.: 16/723,071

(22) Filed: Dec. 20, 2019

(65) Prior Publication Data

US 2021/0188299 A1 Jun. 24, 2021

(51) Int. Cl.
| | |
|---|---|
| *B60W 50/14* | (2020.01) |
| *G05D 1/02* | (2020.01) |
| *G05D 1/00* | (2006.01) |

(52) U.S. Cl.
CPC .......... *B60W 50/14* (2013.01); *G05D 1/0055* (2013.01); *G05D 1/0214* (2013.01); *G05D 1/0246* (2013.01); *G05D 1/0287* (2013.01); *B60W 2050/143* (2013.01); *G05D 2201/02* (2013.01)

(58) Field of Classification Search
CPC ... B60W 50/14; G05D 1/0214; G05D 1/0287; G08G 1/13
See application file for complete search history.

(56) References Cited

U.S. PATENT DOCUMENTS

| | | | |
|---|---|---|---|
| 6,271,746 B1 | 8/2001 | Lisiak et al. | |
| 9,393,977 B2 | 7/2016 | Kramer | |
| 10,635,915 B1* | 4/2020 | Kim | H04W 4/46 |
| 2007/0057816 A1* | 3/2007 | Sakakibara | B62D 15/0275 340/932.2 |
| 2007/0216771 A1 | 9/2007 | Kumar | |
| 2013/0106599 A1* | 5/2013 | Nakayama | G10K 11/26 340/466 |
| 2017/0201687 A1* | 7/2017 | Edney | H04N 5/23238 |
| 2018/0047293 A1* | 2/2018 | Dudar | G08G 1/22 |
| 2018/0152162 A1 | 5/2018 | Krishnaswamy | |
| 2019/0011916 A1* | 1/2019 | Alvarez Rodriguez | G05D 1/0094 |
| 2019/0072410 A1* | 3/2019 | Tang | G01C 21/3697 |
| 2019/0325220 A1* | 10/2019 | Wildgrube | B65F 3/048 |
| 2020/0023903 A1* | 1/2020 | Jeon | B60R 1/00 |
| 2020/0172104 A1* | 6/2020 | Choi | B60W 30/18036 |
| 2021/0061170 A1* | 3/2021 | Krishnaswamy | B60Q 9/00 |

FOREIGN PATENT DOCUMENTS

EP 0655980 A4 5/1996

\* cited by examiner

*Primary Examiner* — Jelani A Smith
*Assistant Examiner* — Toya Pettiegrew
(74) *Attorney, Agent, or Firm* — The Small Patent Law Group LLC; Joseph M. Butscher

(57) ABSTRACT

A system and method determine that a vehicle system is beginning rearward movement based on one or more characteristics of the vehicle system that are monitored by a movement sensor. A warning device is controlled to sound a notification to one or more locations off-board the vehicle system. The warning device is prevented from controlling the warning device to generate the notification while the vehicle system is moving in a direction other than the rearward movement. The warning device is permitted to generate the notification responsive to determining that the vehicle system is beginning the rearward movement.

19 Claims, 3 Drawing Sheets

VEHICLE CONTROL SYSTEM

BACKGROUND

Technical Field

This application relates to a system and method that controls operation of a vehicle system.

Discussion of Art

Some vehicle systems have limited operational capability that can pose safety risks. For example, some rail vehicles do not have the ability to provide images or video of locations rear of the rail vehicles to an operator. This can prevent the operating engineer alone from being able to see if the rail vehicle can safely be backed up along a track. Instead, a spotter must exit the rail vehicle, walk to the back end of the rail vehicle, and communicate with the operating engineer onboard the rail vehicle about what the spotter sees behind the rail vehicle during backing up of the rail vehicle. This poses a safety risk to the spotter, especially in adverse weather conditions. Additionally, the time needed for the spotter to walk to the rear of the rail vehicle can be significant, and this technique can require additional personnel to operate the rail vehicle.

BRIEF DESCRIPTION

In one embodiment, a system includes a controller configured to determine that a vehicle system is beginning rearward movement based on one or more characteristics of the vehicle system that are monitored by a movement sensor. The controller is configured to control a warning device that sounds a notification to one or more locations off-board the vehicle system. The controller is configured to prevent the warning device from controlling the warning device to generate the notification while the vehicle system is moving in a direction other than the rearward movement. The controller also is configured to allow the warning device to generate the notification responsive to determining that the vehicle system is beginning the rearward movement.

In one embodiment, a method includes determining that a vehicle system is moving in a first direction and deactivating a warning device onboard the vehicle system responsive to determining that the vehicle system is moving in the first direction. The warning device can be configured to sound a notification to one or more locations off-board the vehicle system but preventing an onboard operator from controlling the warning device to sound the notification while the warning device is deactivated. The method also includes determining that the vehicle system is moving in a different, second direction, and activating the warning device responsive to determining that the vehicle system is moving in the second direction, the warning device configured to be controlled by the onboard operator to sound the notification responsive to the warning device being activated.

In one embodiment, a system includes a movement sensor configured to monitor one or more characteristics of a multi-vehicle system that indicate movement of the multi-vehicle system and an optical sensor configured to be disposed on a trailing propulsion-generating vehicle of the multi-vehicle system. The optical sensor is configured to output one or more of image data or video data showing an area behind the trailing propulsion-generating vehicle of the multi-vehicle system. The system also includes a controller configured to determine that the multi-vehicle system is beginning movement in a designated direction based on the one or more characteristics that are monitored by the movement sensor. The controller is configured to initiate display of the one or more of the image data or the video data onboard a leading propulsion-generating vehicle of the multi-vehicle system while the movement of the multi-vehicle system is in the designated direction. The controller configured to prevent display of the one or more of the image data or the video data onboard the leading propulsion-generating vehicle of the multi-vehicle system while the movement of the multi-vehicle system is not in the designated direction.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a vehicle control system and method that can monitor characteristics of a vehicle system to determine whether movement of the vehicle system has changed. Responsive to determining that the movement has changed, the control system and method can change a state of or otherwise allow for an indicator device to provide an advisory signal to notify others of the change in movement of the vehicle system. In one example that relates to rail vehicle systems, the control system and method can allow for a horn or other indicator device on a rear most or trailing rail vehicle in the rail vehicle system to be activated from an operator on another rail vehicle in the rail vehicle system. For example, responsive to determining that the rail vehicle system is beginning rearward movement, the control system and method can allow an operator on a leading rail vehicle to activate the horn to warn others of the rearward movement of the rail vehicle system. Optionally, the control system and method can activate an optical sensor (such as a camera) on the back end of the vehicle system and/or otherwise initiate display of images or video from the optical sensor onboard the leading vehicle in the vehicle system (to allow the operator to see behind the vehicle system).

While one or more embodiments are described in connection with a rail vehicle system, not all embodiments are limited to rail vehicle systems. Unless expressly disclaimed or stated otherwise, the inventive subject matter described herein extends to other types of vehicle systems, such as automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together (e.g., as a convoy).

Figure 1:
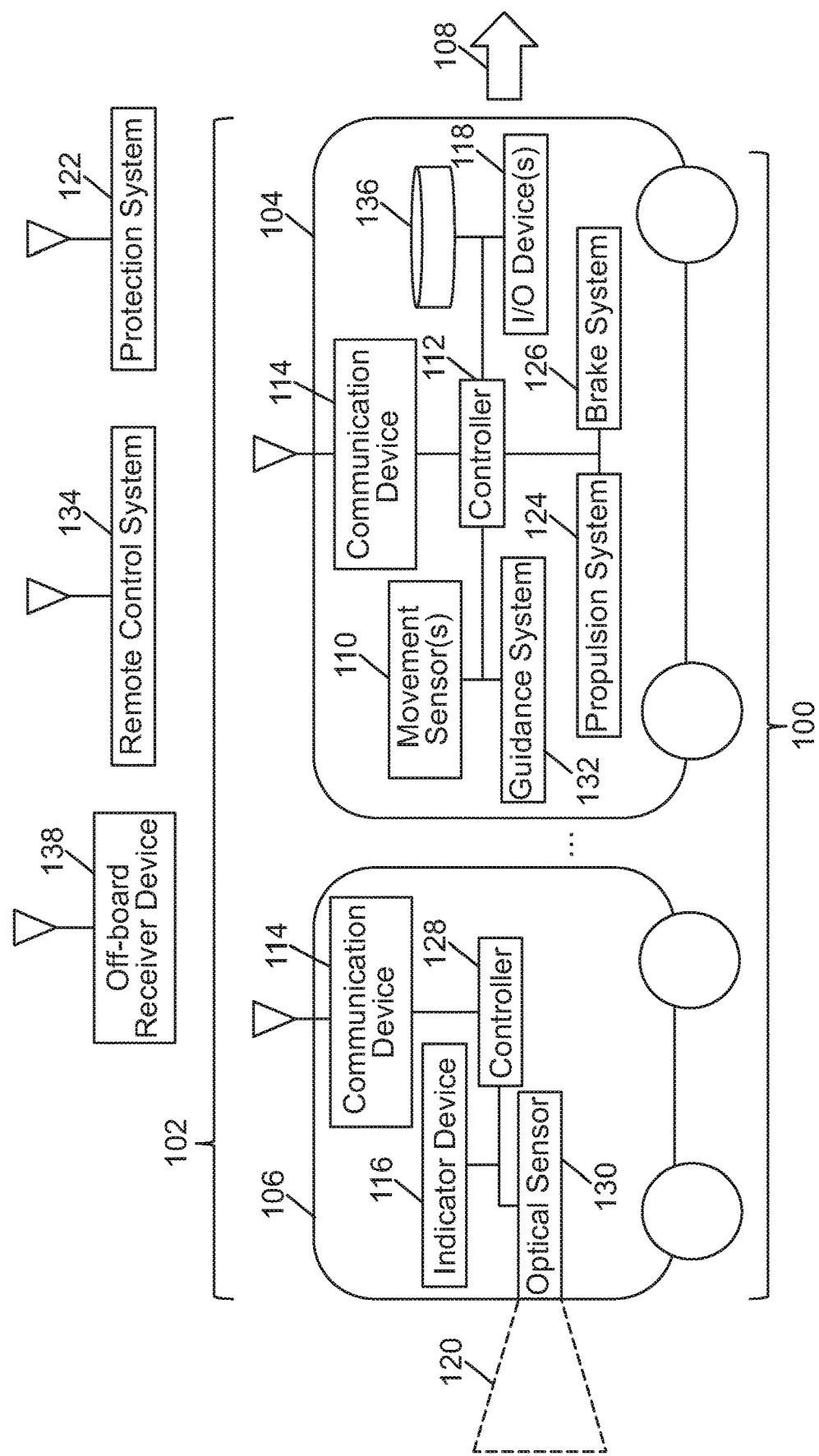
FIG. 1 illustrates one example of a vehicle control system.

FIG. 1 illustrates one example of a vehicle control system 100. The control system can be partially or entirely disposed onboard a vehicle system 102. The vehicle system can be formed from plural vehicles 104, 106 (as shown in FIG. 1). Alternatively, the vehicle system can be formed from a single vehicle (e.g., the vehicle 104). Although not shown in FIG. 1, one or more additional intermediate vehicles may be disposed between the vehicles shown in FIG. 1. The vehicle 104 may be referred to as a lead or leading vehicle and the vehicle 106 may be referred to as a trail or trailing vehicle. In one embodiment, the leading vehicle may be disposed at a front, leading, or head end of the vehicle system along a direction of movement 108 of the vehicle system. The trailing vehicle may be at the back, trailing, or opposite end of the vehicle system. Alternatively, the leading vehicle may not be at the front, leading, or head end of the vehicle system and/or the trailing vehicle may not be at the opposite end of the vehicle system.

The control system optionally includes a movement sensor 110 configured to monitor one or more characteristics of the vehicle system that indicate movement of the vehicle system. Alternatively, the movement sensor may not be included in the control system and/or may be disposed off-board the vehicle system. The movement sensor can be an input device (e.g., touchscreen, button, lever, switch, etc.) that is actuated by an operator (onboard or off-board the vehicle system) to indicate or control the direction in which the vehicle system moves. With respect to rail vehicles, the movement sensor can be a reverser handle that is actuated to begin reverse movement of the vehicle system (e.g., in a direction that is opposite to the movement direction shown in FIG. 1).

As another example, the movement sensor can measure acceleration, speed, changes in location, changes in a magnetic field, or the like, that indicates which direction the vehicle system is moving. The movement sensor can include or represent a global positioning system receiver, an accelerometer, a tachometer measuring a direction of rotation (e.g., of wheels, a propeller, or the like), a wireless triangulation system, a Hall effect sensor, etc. Optionally, the movement sensor can be a camera system (that captures and/or examines changes in images or video that indicate movement of the vehicle system), radar system, LiDAR system, or the like. For example, the movement sensor can be off-board the vehicle system and capture images of the vehicle system to determine which direction the vehicle system is moving.

A controller 112 of the control system may be disposed onboard the lead vehicle. This controller can be referred to as a lead controller as operation of the controller can be associated with the lead vehicle. Alternatively, the controller 112 may be located elsewhere in the vehicle system (other than the lead vehicle). As described below, however, the designation of a controller as the lead controller can be based on which controller of the vehicle system is communicating with an off-board protection system 122 (described below). As a result, the designation of a controller as a lead controller can change such that different controllers onboard the vehicle system may be identified as a lead controller at different times, regardless of which vehicle that the lead controller is located on. The lead controller includes or represents hardware circuitry that includes and/or is coupled with one or more processors (e.g., microprocessors, integrated circuits, field programmable gate arrays, or the like) that perform or direct the operations described herein in connection with the lead controller.

The lead controller can receive output from the movement sensor that indicate the characteristics of the vehicle system that are monitored. For example, the lead controller can receive signals via wired and/or wireless connections that indicate changes in location, changes in speed, changes in heading, or the like, of the vehicle system. In the event that the movement sensor is off-board the vehicle system, the lead controller can receive the output from the movement sensor via a communication device 114. The communication device can represent transceiving circuitry and associated hardware, such as modems, antennas, or the like.

The lead controller can examine the output from the movement sensor and determine whether the vehicle system is beginning different movement based on the characteristic(s) monitored by the movement sensor. In one embodiment, the different movement is rearward movement. For example, the lead controller can determine whether the vehicle system is transitioning from a stationary state (e.g., not moving in any direction relative to a surface on which the vehicle system is disposed) to rearward movement (e.g., movement in a direction that is opposite of the direction of movement shown in FIG. 1). Alternatively, the lead controller can determine whether the vehicle system is changing from a stationary state to movement in any direction, changing from forward or rearward movement to movement along a transverse (e.g., angled) direction, or the like.

The trailing vehicle can include an indicator device 116 that generates an advisory or warning signal. The indicator device optionally can be referred to as a warning device. The indicator device can include or represent a horn that is activated to generate a loud, audible sound as the warning signal to warn others in the vicinity of the trail vehicle that the vehicle system is changing movement (e.g., backing up).

Figure 2:
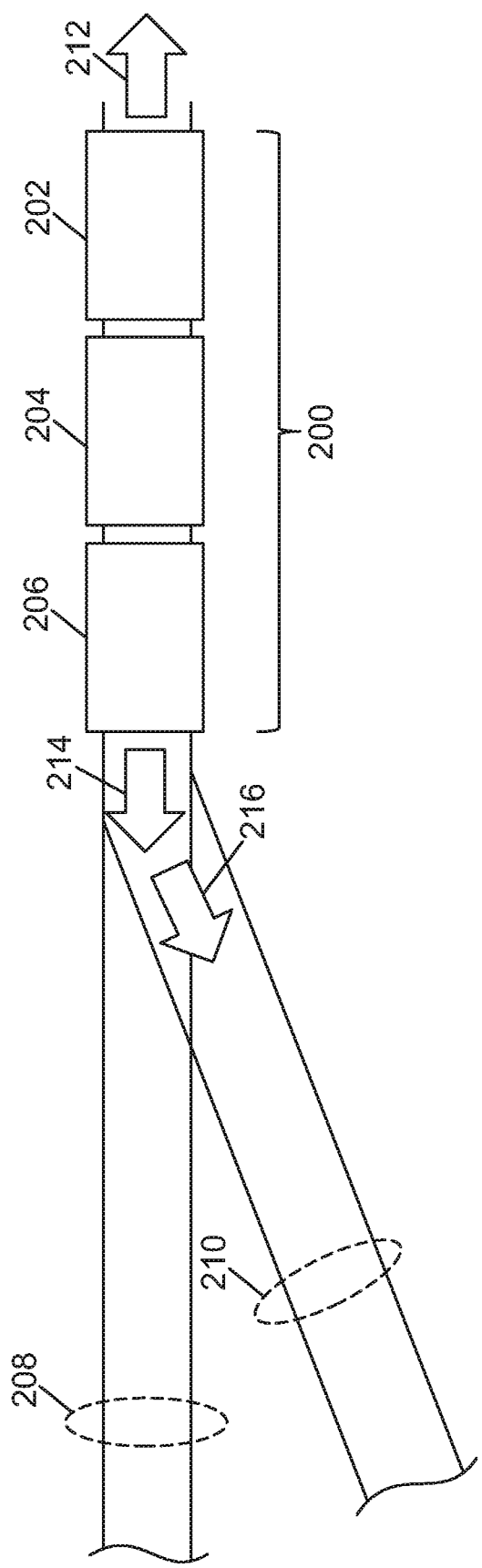
FIG. 2 illustrates some examples of movement of a vehicle system.

In one embodiment, the lead controller can receive input from an operator via one or more input and/or output devices 118 ("I/O Device(s)" in FIG. 2). The input and/or output devices can include touchscreens, buttons, levers, switches, keyboards, pedals, display devices, or the like. This input can direct the activation of the indicator device. For example, responsive to the input and/or output device being actuated by an operator onboard the lead vehicle, the lead controller or the input and/or output device can send a control signal to the indicator device. This control signal may activate the indicator device (e.g., to generate a sound or output another signal).

In one embodiment, the lead controller can prevent the indicator device from generating an output unless and/or until the lead controller determines that the vehicle system is changing movement. For example, while moving in a forward direction or stationary, the lead controller can prevent the horn from generating sound. Actuation of the input and/or output device onboard the lead vehicle by an operator may be prevented by the lead controller from reaching the horn or the lead controller can otherwise prevent the horn from generating a sound. Responsive to the lead controller determining that the movement of the vehicle system has changed (e.g., the vehicle system is beginning rearward movement), the lead controller can allow the horn to be actuated. This can allow the operator onboard the lead vehicle to activate the horn on the trail vehicle to generate a sound responsive to the vehicle system beginning rearward movement. This also can prevent the operator onboard the lead vehicle from activating the horn until the rearward or other different movement begins.

The lead controller can prevent the indicator device from being activated from the lead vehicle by switching the indicator device from a first state to a second state, or by keeping the indicator device in the second state unless and/or until the different movement is detected. In one example, the first state is an active state during which the indicator device can be controlled to generate the warning or advisory signal (e.g., generate the sound) and the second state is an inactive state during which the indicator device cannot generate the warning or advisory signal. In another example, the first state is a remote state and the second state is a local state. The indicator device may be able to be activated from signals sent or originating from the lead vehicle while in the remote state, but may only be able to be activated from signals sent or originating from the trailing vehicle while in the local state (and is not able to be activated from signals sent or originating from the lead vehicle). In another example, the indicator device may remain able to be activated regardless of the movement direction or change in movement direction, but the operator onboard the lead vehicle may only be able to provide input to activate the indicator device in response to the change in movement (e.g., starting rearward movement). For example, the input and/or output device may be a touchscreen that displays a graphical object that can be touched by the operator to activate the indicator device. This graphical object may only be displayed in response to detecting the change in movement and may not be displayed unless and/or until the change in movement is detected.

The trailing vehicle optionally can include an optical sensor 130 that can sense information within a field of view 120 of the optical sensor. The optical sensor can be a camera that outputs images and/or videos representing the area or volume within the field of view. In the illustrated embodiment, the optical sensor may be oriented such that the field of view captures an area or volume rear of the trailing vehicle along the direction of movement shown in FIG. 1. For example, while the vehicle system moves in an opposite (e.g., rearward) direction, the field of view may be an area or volume ahead of the direction in which the vehicle system is moving. The optical sensor alternatively may be another sensor that optically senses information within the field of view in another way. For example, the optical sensor may be a LiDAR system, a radio frequency identification (RFID) reader, etc.

The data that is output by the optical sensor can be communicated from the optical sensor to the input and/or output device(s) of the lead vehicle. For example, the images and/or videos can be communicated from the optical sensor to the input and/or output device(s) for display to the operator.

The lead controller can prevent the data that is output from the optical sensor from being displayed on the input and/or output device(s) unless and/or until the movement of the vehicle system changes direction. For example, while the vehicle system is moving forward or is stationary, the data that is output from the optical sensor may not be displayed on the input and/or output device. But, responsive to determining that the vehicle system is moving in a backward (e.g., rearward) direction, the data output by the optical sensor may be displayed to the operator on the input and/or output device(s) onboard the lead vehicle. The lead controller can prevent the display of the optical sensor data by controlling a state of the optical sensor (e.g., turning the optical sensor off or to an inactive state to prevent display and turning the optical sensor on or to an active state to display the data), by controlling a state of the input and/or output device (e.g., turning a display device off or to an inactive state to prevent display and turning the display device on or to an active state to display the data), or the like.

Alternatively, the indicator device may not be deactivated with respect to all operators onboard the vehicle system at all times. For example, during non-reversing movement of the vehicle system, the indicator device may not be able to be activated by the operator onboard the lead vehicle of the vehicle system, but may be able to be activated by another operator onboard another vehicle (e.g., the trailing vehicles) of the vehicle system. That is, the indicator device may not be completely turned off from use by all operators. The indicator device may then be able to be activated by the operator onboard the lead vehicle responsive to (and only if) the vehicle system is moving in a reversing direction. In one embodiment, the indicator device may still be able to be activated by other operators during reversing movement (e.g., operators onboard the trailing vehicle). Alternatively, the indicator device may only be able to be activated by the operator(s) in the lead vehicle during reversing movement (e.g., operators onboard the trailing vehicle are not able to activate the indicator device).

The allowing or preventing of activation of the indicator device and/or display of optical sensor data can be controlled without deactivating or turning off the indicator device, display device, and/or optical sensor. That is, the indicator device, display device, and/or optical sensor may remain active and on, but not able to generate a warning signal or display video in the lead locomotive unless the vehicle system is moving in the designated direction (e.g., backward). For example, the indicator device, display device, and/or optical sensor may not change states based on a change in movement direction of the vehicle system. Instead, the lead controller can establish a communication channel (e.g., via the communication devices and/or wired connections) responsive to determining that the vehicle system is moving in a designated direction (e.g., backward). For example, the lead controller can establish wired and/or wireless communication channel(s) (or otherwise permit communication of data) between the lead controller and the indicator device responsive to determining that the vehicle system is backing up. The lead controller can then direct the indicator device to generate a sound or otherwise communicate a warning signal, as described above. But, the lead controller can eliminate or prevent data communication between the lead controller and the indicator device responsive to determining that the vehicle system is not backing up. This can prevent the lead controller from directing the indicator device to generate a sound or otherwise communicate a warning signal, as described above.

As another example, the lead controller can establish wired and/or wireless communication channel(s) (or otherwise permit communication of data) between the optical sensor and the input and/or output device responsive to determining that the vehicle system is backing up. The optical sensor can then communicate images and/or videos to the input and/or output devices for display onboard the lead vehicle, as described above. But, the lead controller can eliminate or prevent data communication between the optical sensor and the input and/or output device responsive to determining that the vehicle system is not backing up. This can prevent the images and/or videos from being displayed onboard the lead vehicle, as described above.

FIG. 2 illustrates some examples of movement of a vehicle system 200. The vehicle system shown in FIG. 2 can represent the vehicle system 102 shown in FIG. 1. For example, a vehicle 202 of the vehicle system 200 can represent the lead vehicle 104, a vehicle 206 of the vehicle system 200 can represent the trailing vehicle 106, and an intermediate vehicle 204 of the vehicle system can represent another vehicle 104, 106 or another type of vehicle. The vehicle system is shown on a first route 208 that intersects or meets with a second route 210. These routes can be tracks, roads, paths, or the like.

The vehicle system 200 can be headed along the route 208 along a movement direction 212. The vehicle system may then stop and begin moving in an opposite movement direction 214. The lead controller can prevent the indicator device from being activated and/or prevent optical sensor output from being displayed on the lead vehicle 202 responsive to determining the movement of the vehicle system in the direction 214, as described herein. As another example, the vehicle system 200 can be headed along the route 202 in the direction 214, with the vehicle 206 representing the lead vehicle 104 and the vehicle 202 representing the trailing vehicle 106. The lead controller can prevent the indicator device from being activated and/or prevent optical sensor output from being displayed on the lead vehicle 206 responsive to determining the movement of the vehicle system has changed from the direction 214 to a transverse direction 216 (e.g., left of the direction 208).

Returning to the description of the control system shown in FIG. 1, in one embodiment, the vehicle system may communicate with one or more off-board systems and/or devices. As one example, the vehicle system may communicate with an off-board protection system 122 that communicates with the vehicle system and other vehicle systems traveling within an area associated with the protection system. The protection system can monitor the status of routes and/or vehicle systems in the associated area and communicate signals to the vehicle systems that prevent the vehicle systems from entering into identified segments of routes and/or allow the vehicle systems to enter into the identified segments of the routes. The protection system can represent hardware circuitry that includes and/or is connected with one or more processors and transceiving hardware (e.g., a communication device as described herein).

The protection system may be a positive protection system that communicates positive signals to vehicle systems. These signals indicate that a vehicle system can enter into an upcoming segment of a route. If a controller onboard the vehicle system does not receive a positive signal from the protection system for an upcoming segment of the route, then the controller may prevent the vehicle system from entering into the upcoming segment. For example, the controller can automatically control a propulsion system 124 (e.g., one or more engines, motors, propellers, etc.) from propelling the vehicle system into the upcoming segment, automatically control a brake system 126 (e.g., one or more friction brakes, air brakes, regenerative brakes, etc.) to stop the vehicle system from entering into the upcoming segment, automatically steer the vehicle system in a direction that prevents the vehicle system from entering into the upcoming segment, etc. Although not shown in FIG. 1, the trailing vehicle also can include a propulsion system 124 and/or brake system 126.

Alternatively, the controller of the vehicle system can prevent the vehicle system from entering into an upcoming segment unless a positive signal is received by preventing commands input by the operator of the vehicle system from controlling the propulsion system and/or brake system from moving the vehicle system into the upcoming segment (unless and/or until the positive signal is received). One example of such a positive control system is a positive train control system.

The protection system may be a negative protection system that communicates negative signals to vehicle systems. These signals are communicated to indicate that a vehicle system cannot enter into an upcoming segment of a route. If a controller onboard the vehicle system does not receive a negative signal from the protection system for an upcoming segment of the route, then the controller allows the vehicle system to enter into the upcoming segment. The controller may only prevent the vehicle system from entering into the upcoming segment if the negative protection system sends a negative signal (indicating that the vehicle system cannot enter into the upcoming route segment).

The vehicle system may include several controllers onboard different vehicles. For example, each of two or more propulsion-generating vehicles 104, 106 in the vehicle system may each include a controller. As described above, the lead vehicle may include the lead controller. The trailing vehicle may include a trail controller 128. The trail controller can be a controller like the lead controller but disposed onboard the trailing vehicle. In one embodiment, the protection system may communicate with one controller of the vehicle system to ensure that multiple controllers are not receiving signals from the protection system and separately acting upon the signals. The control system may designate or identify one of the controllers 112, 128 as the lead controller in one embodiment. The controller designated or identified as the lead controller can be the controller that communicates with the protection system and that controls movement of the vehicle system based on signals received from the protection system. The designation or identification of which controller 112, 128 is the lead controller can change, regardless of where the controller designated or identified as the lead controller is located in the vehicle system.

For example, during a first period of time, the controller 112 onboard the lead vehicle can be the lead controller as this controller 112 is receiving signals from the protection system and using these signals to control (e.g., restrict) the movement of the vehicle system. The controller 112 can send control signals to the controller 128 during this first period of time to remotely control or direct how the controller 128 controls operation of the propulsion system and/or brake system of the trailing vehicle. The controller 128 can be coupled with a communication device 114 onboard the trailing vehicle to communicate with the controller 112 and/or other off-board devices and/or systems.

During a subsequent second period of time, the control system may switch to the controller 128 onboard the trailing vehicle as the lead vehicle. The controller 128 then becomes the controller of the vehicle system that receives the signals from the protection system and uses these signals to control the movement of the vehicle system. The controller 128 can send control signals to the controller 112 during this second period of time to remotely control or direct how the controller 112 controls operation of the propulsion system and/or brake system of the trailing vehicle.

In one embodiment, the control system can change which of the controllers is the lead controller that communicates with the protection system to control movement of the vehicle system based on the change in movement that is detected. For example, during movement of the vehicle system along a first direction, the controller 112 may be designated as the lead controller that communicates with the protection system to control movement of the vehicle system. But, responsive to determining that movement of the vehicle system has changed to a different direction (or that reverse movement has begun from a stationary state), the controller 128 may be designated as the lead controller that communicates with the protection system to control movement of the vehicle system. The controllers 112, 128 can determine which controller 112, 128 is to be designated as the lead controller based on the change in movement that is detected, as described above.

As described above, the indicator device may be activated (or capable of being activated) from the lead vehicle and/or the output from the optical sensor may be displayed onboard the lead vehicle responsive to determining a change in movement direction of the vehicle system. Optionally, the indicator device may be activated or capable of being activated and/or the optical sensor output may be displayed responsive to both the change in movement direction being detected and the vehicle system being at a designated location. The characteristics of the vehicle system that are monitored by the movement sensor can be a location of the vehicle system. A tangible and non-transitory computer-readable storage medium (e.g., a memory 136) may be disposed onboard the vehicle system and accessible to one or more of the controllers. This memory can be a computer hard drive, a removable computer disk, an optical disc, or the like. The memory can store locations associated with features of interest along the routes on which the vehicle system travels or may travel. The features of interest can be crossings of one type of route over another type of route (e.g., a crossing of a road over a track), intersections between the same type of routes, sidings, depots, warehouses, urban areas, or other operator-defined features.

When a change in direction occurs (e.g., from forward to reverse, from stationary to reverse, or another change in direction), the lead controller can determine whether the vehicle system is at or within a designated proximity (e.g., fifty meters) of a feature of interest stored in the memory. If the change in direction is detected and the vehicle system is at or within the designated proximity of the feature of interest, then the lead controller can activate or allow activation of the indicator device and/or permit the optical sensor output to be displayed onboard the lead vehicle. But, if the change in direction is detected and the vehicle system is not at or within the designated proximity of the feature of interest, then the lead controller can prevent or otherwise not activate or allow activation of the indicator device and/or not permit the optical sensor output to be displayed onboard the lead vehicle.

Optionally, the control system can dictate whether the indicator device can be activated and/or the optical sensor output is displayed when controlled by a system other than a human operator onboard the vehicle system. For example, the vehicle system may include a guidance system 132 that is at least partially onboard the vehicle system. The guidance system can represent one or more processors and associated circuitry that determine operational settings for the vehicle system to use while traveling along one or more routes. These operational settings may be throttle settings, brake settings, speeds, accelerations, etc. that are associated by the guidance system with different locations along the route, different times, and/or different distances along the route.

The guidance system can determine the operational settings to drive the vehicle system toward one or more objectives, such as reducing emission generation, reducing fuel consumption, reducing wear, reducing audible noise, or the like, relative to the vehicle system not traveling according to the operational settings. The operational settings determined by the guidance system also can dictate whether the indicator device is activated and/or the optical sensor output is shown onboard the lead vehicle. The lead controller of the control system can restrict when these operational settings can activate the indicator device and/or display the optical sensor output on the lead locomotive based on the detected change in direction and/or location of the vehicle system, as described herein. For example, the lead controller can prevent the indicator device from being activated and/or the optical sensor output from being displayed even though the guidance system directs either of these actions to occur if the lead controller does not determine that the vehicle system has changed direction and/or is not at a designated location.

A remote control system 134 disposed off-board the vehicle system can remotely control movement of the vehicle system. The remote control system can represent one or more processors and associated circuitry that send control signals to the lead controller from off-board the vehicle system. These signals can direct the lead controller how to move the vehicle system. One or more operators at the remote control system can provide input that is used to generate and send these control signals. The control signals from the remote control system may direct the indicator device to activate and/or the optical sensor output to be displayed onboard the lead vehicle. But, the lead controller can prevent either or both of these actions from occurring unless the change in movement is detected (e.g., the vehicle system begins reversing) and/or the vehicle system is at the designated location, as described above.

The indicator device is described as being a horn or other device that generates sounds to warn others of the movement of the vehicle system. Optionally, the indicator device can include or instead be one or more lights that are illuminated to provide the warning signal. For example, instead of or in addition to generating sound, the indicator device may activate a light as the warning signal.

In another example, the indicator device may be coupled with the communication device (e.g., onboard the trailing vehicle and/or the lead vehicle) and can issue one or more warning signals to off-board devices responsive to being activated. These off-board devices can include receiver devices 138 that include transceiving circuitry and associated hardware (e.g., modems, antennas, etc.) for wirelessly communicating with the communication device(s) of the vehicle system. Instead of or in addition to the indicator device generating a sound and/or activating a light, the indicator device can communicate a wireless signal via the communication device. This wireless signal can be broadcast and/or transmitted to one or more of the receiver devices. As one example, the receiver device can be a device that is held or worn by personnel that are off-board the vehicle system, such as maintenance personnel, an operator of the vehicle system that has temporarily de-boarded the vehicle system, or another person off-board the vehicle system. As another example, the receiver device can be a wayside assembly, such as a signal light, a horn, or the like, alongside the route. As another example, the receiver device can be onboard another vehicle or vehicle system. Responsive to receiving the signal from the indicator device, the receiver device(s) can notify others of the change in direction of the vehicle system. For example, the receiver device(s) can activate a light, generate a sound, display a message, vibrate, etc., to warn a holder, user, or person nearby the receiver device(s) of the vehicle system changing direction.

Figure 3:
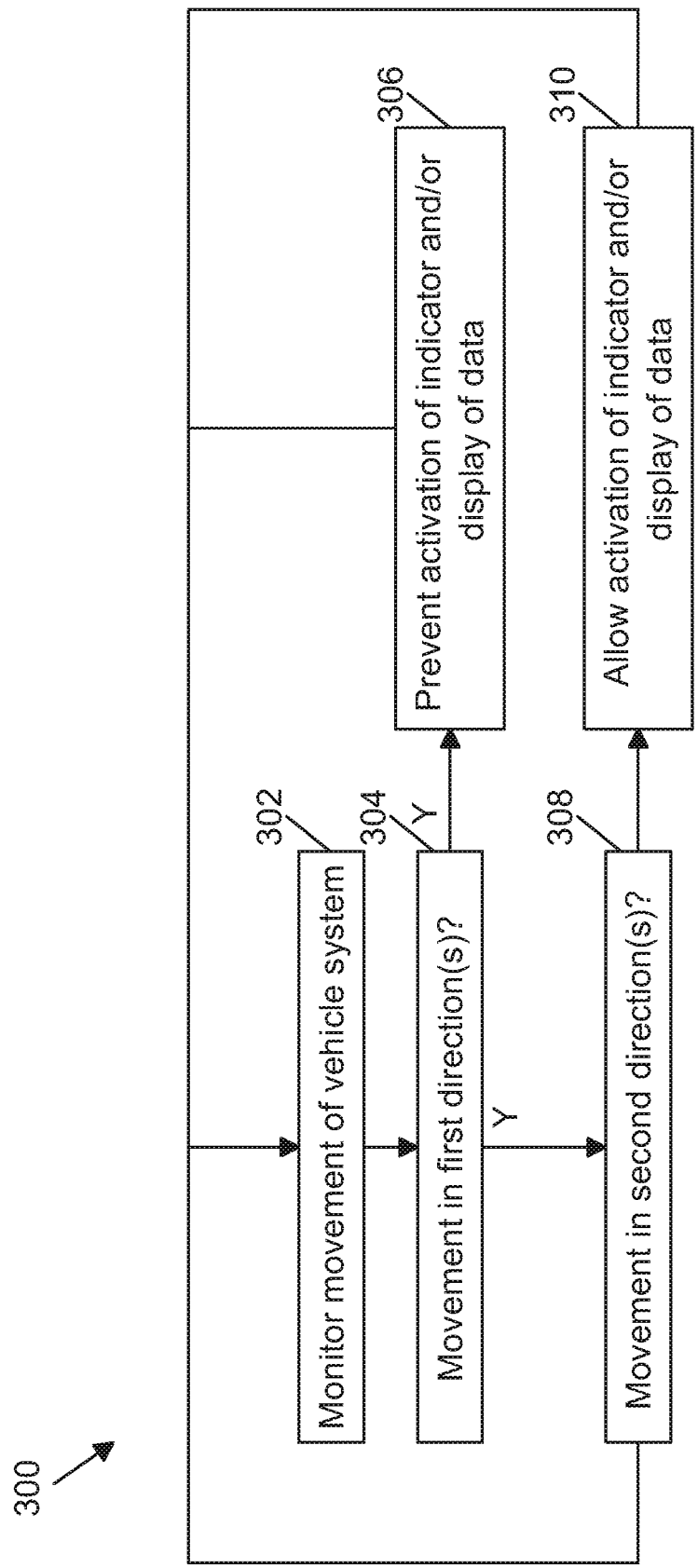
FIG. 3 illustrates a flowchart of one example of a method for controlling operation of a vehicle system.

FIG. 3 illustrates a flowchart of one example of a method 300 for controlling operation of a vehicle system. The method represents operations that may be performed by the control system (e.g., by the controllers of the control system) to determine whether to activate or allow activation of an indicator device and/or to allow display of optical sensor output onboard a lead vehicle in response to detecting a change in movement, such as reverse movement. At 302, movement of the vehicle system is monitored. For example, the direction in which the vehicle system is moving may be determined. As another example, the direction in which the vehicle system begins to move from a stationary state can be determined. Alternatively, a change in movement of the vehicle system can be identified (e.g., turning right, turning left, etc.). At 304, a determination is made as to whether the movement of the vehicle system is in one or more first directions. The first direction(s) may be a forward direction relative to the direction in which the vehicle is oriented to move on the route. For example, the forward direction may be the same direction in which the operator's seat faces in the vehicle. Alternatively, the first directions may be a set of different directions, such as all non-reversing directions (e.g., directions that are not rearward movement of the vehicle system).

If the movement of the vehicle is in the first direction(s), then the method may prevent an indicator device from sounding or sending an alarm or warning and/or may prevent images and/or video from being displayed in the vehicle from which the operator is controlling the vehicle system. For example, the method can prevent a horn from generating a sound and/or from a display device to show images and/or videos to prevent distracting the operator. As a result, flow of the method 300 can proceed toward 306.

At 306, an indicator is prevented from being generated and/or presentation of optical sensor data is prevented from being displayed. For example, the indicator device can be prevented from being activated to issue an advisory or warning signal. The data output from the optical sensor can be prevented from being displayed onboard the lead vehicle from which an operator is controlling the vehicle system. Flow of the method 300 can then return toward 302 to continue monitoring movement of the vehicle system or may terminate.

But, if the movement of the vehicle system is determined to not be in the first direction(s) at 304, then flow of the method 300 can proceed toward 308. At 308, a determination is made as to whether the movement of the vehicle system is in one or more second direction(s). In one embodiment, the second direction(s) is a single direction-a reversing or backward direction. For example, the reversing or backward direction may be the opposite direction in which the operator's seat faces in the vehicle. Alternatively, the second directions may be a set of different directions, such as the directions that are not the first directions.

If the movement of the vehicle is in the second direction(s), then the method may allow an indicator device to sound or send an alarm or warning and/or may allow images and/or video from being displayed in the vehicle from which the operator is controlling the vehicle system. As a result, flow of the method 300 can proceed toward 310.

At 310, an indicator is allowed to be generated and/or optical sensor data is allowed to be displayed. For example, the indicator device can be allowed to be activated to issue an advisory or warning signal. The data output from the optical sensor can be allowed to be displayed onboard the lead vehicle from which an operator is controlling the vehicle system. Flow of the method 300 can then return toward 302 to continue monitoring movement of the vehicle system or may terminate.

In one embodiment, a system includes a controller configured to determine that a vehicle system is beginning rearward movement based on one or more characteristics of the vehicle system that are monitored by a movement sensor. The controller is configured to control a warning device that sounds a notification to one or more locations off-board the vehicle system. The controller is configured to prevent the warning device from controlling the warning device to generate the notification while the vehicle system is moving in a direction other than the rearward movement. The controller also is configured to allow the warning device to generate the notification responsive to determining that the vehicle system is beginning the rearward movement.

Optionally, the warning device includes a horn and the controller is configured to allow the horn to generate one or more sounds that are audible off-board the vehicle system as the notification.

Optionally, the controller also is configured to prevent data output from an optical sensor from being displayed onboard the vehicle system while the vehicle system is moving in the direction other than the rearward movement. The controller can be configured to permit display of the data output by the optical sensor onboard the vehicle system.

Optionally, the controller is configured to allow the data output by the optical sensor to be displayed such that one or more of image data or video data indicative of an area ahead of the rearward movement of the vehicle system is displayed to an onboard operator.

Optionally, the vehicle system is formed from plural vehicles traveling together along one or more routes with an onboard operator disposed on a first vehicle of the plural vehicles and the warning device disposed on a second vehicle of the plural vehicles.

Optionally, the first vehicle is a leading end vehicle of the plural vehicles and the second vehicle is a trailing end vehicle of the plural vehicles.

Optionally, the controller is a first controller configured to be disposed onboard the first vehicle and to remotely control operation of a second controller disposed on the second vehicle. The second controller can take control of the first controller to remotely control operation of the first controller responsive to determining that the vehicle system is beginning the rearward movement.

Optionally, the movement sensor monitors a location of the vehicle system as at least one of the one or more characteristics of the vehicle system. The controller can be configured to determine whether the location that is monitored by the movement sensor and where the rearward movement of the vehicle system is beginning is a designated location. The controller also can be configured to prevent the warning device from generating the notification while either the location is not the designated location or the vehicle system is not moving in the rearward direction. The controller can be configured to allow the warning device to generate the notification while both the location is the designated location and the vehicle system is moving in the rearward direction.

In one embodiment, a method includes determining that a vehicle system is moving in a first direction and deactivating a warning device onboard the vehicle system responsive to determining that the vehicle system is moving in the first direction. The warning device can be configured to sound a notification to one or more locations off-board the vehicle system but preventing an onboard operator from controlling the warning device to sound the notification while the warning device is deactivated. The method also includes determining that the vehicle system is moving in a different, second direction, and activating the warning device responsive to determining that the vehicle system is moving in the second direction, the warning device configured to be controlled by the onboard operator to sound the notification responsive to the warning device being activated.

Optionally, the first direction and the second direction are opposite directions.

Optionally, the first direction is a forward movement direction of the vehicle system and the second direction is a rearward movement direction of the vehicle system.

Optionally, the method also can include preventing display of one or more of image data or video data to the onboard operator while the vehicle system is moving in the first direction, and displaying the one or more of the image data or the video data to the onboard operator while the vehicle system is moving in the second direction.

Optionally, the one or more of the image data or the video data shows an area ahead of rearward movement of the vehicle system.

Optionally, the vehicle system is formed from plural vehicles traveling together along one or more routes with the onboard operator disposed on a first vehicle of the plural vehicles and the warning device is disposed on a second vehicle of the plural vehicles.

Optionally, the first vehicle is a leading end vehicle of the plural vehicles and the second vehicle is a trailing end vehicle of the plural vehicles.

In one embodiment, a system includes a movement sensor configured to monitor one or more characteristics of a multi-vehicle system that indicate movement of the multi-vehicle system and an optical sensor configured to be disposed on a trailing propulsion-generating vehicle of the multi-vehicle system. The optical sensor is configured to output one or more of image data or video data showing an area behind the trailing propulsion-generating vehicle of the multi-vehicle system. The system also includes a controller configured to determine that the multi-vehicle system is beginning movement in a designated direction based on the one or more characteristics that are monitored by the movement sensor. The controller is configured to initiate display of the one or more of the image data or the video data onboard a leading propulsion-generating vehicle of the multi-vehicle system while the movement of the multi-vehicle system is in the designated direction. The controller configured to prevent display of the one or more of the image data or the video data onboard the leading propulsion-generating vehicle of the multi-vehicle system while the movement of the multi-vehicle system is not in the designated direction.

Optionally, the movement in the designated direction is rearward movement of the multi-vehicle system.

Optionally, the controller is configured to activate a warning device onboard the trailing propulsion-generating vehicle from a deactivated state to an activated state responsive to the movement of the multi-vehicle system in the designated direction beginning. The warning device can be prevented from being controllable from off-board the trailing propulsion-generating vehicle to sound a warning while in the deactivated state. The warning device can be controllable from off-board the trailing propulsion-generating vehicle to sound the warning while in the activated state.

Optionally, the movement sensor monitors a location of the multi-vehicle system as at least one of the one or more characteristics of the multi-vehicle system. The controller can be configured to switch from preventing display of the one or more of the image data or the video data to displaying the one or more of the image data or the video data responsive to (a) the location monitored by the movement sensor being a designated location and (b) the movement of the multi-vehicle system being in the designated direction.

Optionally, the movement sensor is configured to output a position of a manually actuated device onboard the multi-vehicle system as the one or more characteristics.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
a controller configured to determine that a vehicle system is beginning movement in a rearward direction based on a location of the vehicle system that is monitored by a movement sensor, the controller configured to control a warning device that sounds a notification to one or more locations off-board the vehicle system,
the controller configured to determine whether the location that is monitored by the movement sensor where the movement of the vehicle system in the rearward direction is beginning is a designated location, the controller configured to prevent an operator from controlling the warning device to generate the notification while either the location that is monitored is not the designated location or the vehicle system is not moving in the rearward direction, the controller configured to allow the warning device to generate the notification while both the location is the designated location and the vehicle system is moving in the rearward direction.

2. The system of claim 1, wherein the warning device includes a horn and the controller is configured to allow the horn to generate one or more sounds that are audible off-board the vehicle system as the notification.

3. The system of claim 1, wherein the controller also is configured to prevent data output from an optical sensor from being displayed onboard the vehicle system while the vehicle system is moving in a direction other than the rearward direction, the controller configured to permit display of the data output by the optical sensor onboard the vehicle system.

4. The system of claim 3, wherein the controller is configured to allow the data output by the optical sensor to be displayed such that one or more of image data or video data indicative of an area ahead of the movement of the vehicle system in the rearward direction is displayed to an onboard operator.

5. The system of claim 1, wherein the vehicle system is formed from plural connected vehicles traveling together along one or more routes with an onboard operator disposed on a first vehicle of the plural vehicles and the warning device disposed on a second vehicle of the plural vehicles.

6. The system of claim 5, wherein the first vehicle is a leading end vehicle of the plural connected vehicles and the second vehicle is a trailing end vehicle of the plural connected vehicles.

7. The system of claim 5, wherein the controller is a first controller configured to be disposed onboard the first vehicle and to remotely control operation of a second controller disposed on the second vehicle,
wherein the second controller takes control of the first controller to remotely control operation of the first controller responsive to determining that the vehicle system is beginning the movement in the rearward direction.

8. A method comprising:
determining that a multi-vehicle system is moving in a first direction;
switching a warning device onboard a trailing end vehicle of the multi-vehicle system to a local state where the warning device is activated from onboard the trailing end vehicle but cannot be activated from onboard a leading end vehicle of the multi-vehicle system, the warning device switched to the local state responsive to determining that the vehicle system is moving in the first direction, the warning device configured to sound a notification to one or more locations off-board the multi-vehicle system when activated;
determining that the multi-vehicle system is moving in a different, second direction; and
switching the warning device to a remote state where the warning device is activated from onboard the leading end vehicle responsive to determining that the multi-vehicle system is moving in the second direction, the warning device configured to be controlled by an operator onboard the leading end vehicle to sound the notification responsive to the warning device being switched to the remote state.

9. The method of claim 8, wherein the first direction and the second direction are opposite directions.

10. The method of claim 9, wherein the first direction is a forward movement direction of the multi-vehicle system and the second direction is a rearward movement direction of the multi-vehicle system.

11. The method of claim 8, further comprising:
preventing display of one or more of image data or video data to the operator onboard the leading end vehicle while the multi-vehicle system is moving in the first direction; and
displaying the one or more of the image data or the video data to the operator onboard the leading end vehicle while the multi-vehicle system is moving in the second direction.

12. The method of claim 11, wherein the one or more of the image data or the video data shows an area ahead of rearward movement of the multi-vehicle system.

13. A system comprising:
a movement sensor configured to monitor one or more characteristics of a multi-vehicle system that indicate movement of the multi-vehicle system;
an optical sensor configured to be disposed on a trailing propulsion-generating vehicle of the multi-vehicle system, the optical sensor configured to output one or more of image data or video data showing an area behind the trailing propulsion-generating vehicle of the multi-vehicle system; and
a controller configured to determine that the multi-vehicle system is beginning movement in a designated direction based on the one or more characteristics that are monitored by the movement sensor,
the controller configured to initiate display of the one or more of the image data or the video data onboard a leading propulsion-generating vehicle of the multi-vehicle system while the movement of the multi-vehicle system is in the designated direction,
the controller configured to prevent display of the one or more of the image data or the video data onboard the leading propulsion-generating vehicle of the multi-vehicle system while the movement of the multi-vehicle system is not in the designated direction.

14. The system of claim 13, wherein the movement in the designated direction is rearward movement of the multi-vehicle system.

15. The system of claim 13, wherein the controller is configured to activate a warning device onboard the trailing propulsion-generating vehicle from a deactivated state to an activated state responsive to the movement of the multi-vehicle system in the designated direction beginning, the warning device prevented from being controllable from off-board the trailing propulsion-generating vehicle to sound a warning while in the deactivated state, the warning device controllable from off-board the trailing propulsion-generating vehicle to sound the warning while in the activated state.

16. The system of claim 13, wherein the movement sensor monitors a location of the multi-vehicle system as at least one of the one or more characteristics of the multi-vehicle system, the controller configured to switch from preventing display of the one or more of the image data or the video data to displaying the one or more of the image data or the video data responsive to (a) the location monitored by the movement sensor being a designated location and (b) the movement of the multi-vehicle system being in the designated direction.

17. The system of claim 13, wherein the movement sensor is configured to output a position of a manually actuated device onboard the multi-vehicle system as the one or more characteristics.

18. The system of claim 13, wherein the leading propulsion-generating vehicle and the trailing propulsion-generating vehicle are mechanically coupled or interconnected with each other in the multi-vehicle system.

19. The system of claim 1, wherein the vehicle system is a multi-vehicle system formed from at least a leading end vehicle and a trailing end vehicle with the controller on the leading end vehicle and the warning device onboard the trailing end vehicle, the controller configured to switch the warning device to a local state that prevents activation of the warning device from the leading end vehicle while either the location that is monitored is not the designated location or the vehicle system is not moving in the rearward direction, the controller configured to switch the warning device to a remote state that allows activation of the warning device from the leading end vehicle while both the location is the designated location and the vehicle system is moving in the rearward movement.

\* \* \* \* \*